United States Patent
Gu et al.

(10) Patent No.: US 11,359,602 B2
(45) Date of Patent: Jun. 14, 2022

(54) PITCH VARYING DEVICE, PITCH VARYING METHOD AND PITCH VARYING CONTROL DEVICE FOR WIND TURBINE BLADE AND WIND TURBINE

(71) Applicant: BEIJING GOLDWIND SCIENCE & CREATION WINDPOWER EQUIPMENT CO., LTD., Beijing (CN)

(72) Inventors: Yaqi Gu, Beijing (CN); Bing Zhu, Beijing (CN)

(73) Assignee: BEIJING GOLDWIND SCIENCE & CREATION WINDPOWER EQUIPMENT CO., LTD., Beijing (CN)

( * ) Notice: Subject to any disclaimer, the term of this patent is extended or adjusted under 35 U.S.C. 154(b) by 0 days.

(21) Appl. No.: 17/376,418

(22) Filed: Jul. 15, 2021

(65) Prior Publication Data

US 2021/0340953 A1   Nov. 4, 2021

Related U.S. Application Data

(63) Continuation-in-part of application No. 16/090,442, filed as application No. PCT/CN2018/079792 on Mar. 21, 2018, now abandoned.

(30) Foreign Application Priority Data

Jul. 6, 2017   (CN) .......................... 201710546447.2

(51) Int. Cl.
*F03D 7/02* (2006.01)
*F03D 7/04* (2006.01)
*F03D 80/70* (2016.01)

(52) U.S. Cl.
CPC ........... *F03D 7/0224* (2013.01); *F03D 7/042* (2013.01); *F03D 80/70* (2016.05); *F05B 2220/30* (2013.01);
(Continued)

(58) Field of Classification Search
CPC .......... F03D 7/0224; F03D 7/04; F03D 7/042; F03D 80/70; F05B 2260/79;
(Continued)

(56) References Cited

U.S. PATENT DOCUMENTS 4,462,753 A *   7/1984   Harner .................. F03D 7/0224
                                                                  416/49
2011/0020136 A1*   1/2011   Numajiri ............... F03D 7/0224
                                                                  416/246
(Continued)

FOREIGN PATENT DOCUMENTS

CN   201953567 U   *   8/2011
CN   102661238 A   *   9/2012
(Continued)

OTHER PUBLICATIONS

The Extended European Search Report dated May 14, 2019; Appln. No. 18780013.1.*
(Continued)

*Primary Examiner* — Christopher Verdier

(57) ABSTRACT

A pitch varying device, a pitch varying method and a pitch varying control device for a wind turbine blade and a wind turbine are provided. The blade pitch varying device includes: a disc-type driving structure perpendicular to an axis of a pitch bearing, a track surrounding the axis of the pitch bearing being provided on the disc-type driving structure; a first linear telescopic driving mechanism connected to the track through a first clamping member capable of clamping the track, and the first linear telescopic driving
(Continued)

mechanism and the first clamping member being connected through a hinge connection; and a second linear telescopic driving mechanism connected to the track through a second clamping member capable of clamping the track, and the second linear telescopic driving mechanism and the second clamping member being connected through a hinge connection.

19 Claims, 2 Drawing Sheets

(52) U.S. Cl.
CPC ....... *F05B 2260/76* (2013.01); *F05B 2260/79* (2013.01); *F05B 2270/328* (2013.01); *F05B 2270/604* (2013.01)

(58) Field of Classification Search
CPC .......... F05B 2260/406; F05B 2270/328; F05B 2270/602; F05B 2270/604; F05B 2260/74; F05B 2260/76; Y02E 10/72
See application file for complete search history.

(56) References Cited

U.S. PATENT DOCUMENTS

| | | | | |
|---|---|---|---|---|
| 2012/0134806 | A1* | 5/2012 | Andersen | F03D 7/0224 416/1 |
| 2013/0058784 | A1* | 3/2013 | Sorensen | F03D 7/0224 416/1 |
| 2013/0193686 | A1* | 8/2013 | Perley | F03D 7/0224 290/44 |
| 2018/0051671 | A1* | 2/2018 | Gaile | F03D 7/0224 |
| 2018/0051674 | A1* | 2/2018 | Gaile | F03D 80/70 |
| 2019/0277253 | A1* | 9/2019 | Wu | F03D 7/04 |

FOREIGN PATENT DOCUMENTS

| | | | |
|---|---|---|---|
| CN | 102734067 | A * | 10/2012 |
| CN | 103867388 | A * | 6/2014 |
| CN | 203847326 | U * | 9/2014 |
| CN | 105351145 | A * | 2/2016 |
| CN | 206054179 | U * | 3/2017 |
| CN | 206290368 | U * | 6/2017 |
| DE | 202015001902 | U1 * | 6/2016 |
| EP | 3104000 | A1 * | 12/2016 |
| KR | 20140003908 | U * | 6/2014 |
| KR | 20150033762 | A * | 4/2015 |
| KR | 101548690 | B1 * | 9/2015 |

OTHER PUBLICATIONS

First Chinese Office Action dated May 17, 2019; Appln. 201710546447.2 (with 1 page English Summary).*
International Search Report dated May 30, 2018; PCT/CN2018/079792.*

* cited by examiner

PITCH VARYING DEVICE, PITCH VARYING METHOD AND PITCH VARYING CONTROL DEVICE FOR WIND TURBINE BLADE AND WIND TURBINE

CROSS REFERENCE TO RELATED APPLICATIONS

This application is a continuation-in-part of U.S. patent application Ser. No. 16/090,442, filed on Oct. 1, 2018, now abandoned which is the national phase of International Application No. PCT/CN2018/079792, titled "PITCH VARYING DEVICE, PITCH VARYING METHOD AND PITCH VARYING CONTROL DEVICE FOR WIND TURBINE BLADE AND WIND TURBINE", filed on Mar. 21, 2018, which claims the benefit of priority to Chinese Patent Application No. 201710546447.2, titled "PITCH VARYING DEVICE AND PITCH VARYING METHOD FOR WIND TURBINE BLADE AND WIND TURBINE", filed with the State Intellectual Property Office of People's Republic of China on Jul. 6, 2017, the entire disclosures thereof are incorporated herein by reference.

FIELD

The present application relates to the field of wind power generation devices, and in particular relates to a pitch varying device, a pitch varying method and a pitch varying control device for a wind turbine blade and a wind turbine.

BACKGROUND

A pitch varying system for a wind turbine is used to adjust a blade pitch angle, to allow the wind turbine to work in the optimal working condition, and the pitch varying system is also an important part of a safety system of the wind turbine, which can ensure the normal start and stop and the emergency stop in a special situation of the wind turbine. The wind turbine is in a small-angle pitch varying mode for about 70% of the working time, which requires the pitch varying system to have a high accuracy and a pitch varying mechanism to have a short actuating stroke. The wind turbine is in a large-angle pitch varying mode for about 30% of the working time, which requires the pitch varying system to have a quick response and the pitching mechanism to have a long actuating stroke.

The existing gear-driven pitch varying system is a set of pitch varying actuators, wherein a pitch varying motor drives a pitch varying speed reducer, the pitch varying speed reducer drives a pitch varying output gear to rotate, the pitch varying output gear drives a pitch bearing to rotate, and the pitch bearing drives blades to vary the blade pitch. A pitch varying driving wheel (i.e., the pitch varying output gear) has outer teeth, the pitch bearing has inner teeth, and the blades are fixed to the pitch bearing by bolts. In a case that the pitch bearing is driven by the gear, some teeth of both the pitch varying output gear and the pitch bearing may be abraded during the small-angle pitch varying mode, causing excessive abrasion of the inner teeth of the pitch bearing, and resulting in fatigue failure of the gear, and eventually the gear will be broken and damaged. Damages to the gear of the pitch bearing will result in abnormal pitch varying, and a new pitch bearing is required to replace the broken one, which will increase the maintenance cost of the wind turbine.

SUMMARY

A pitch varying device, a pitch varying method and a pitch varying control device for a wind turbine blade and a wind turbine are provided according to the present application, to address the problem that a transmission gear is severely abraded during the small-angle pitch varying mode when a gear driving system is employed in the existing wind turbine.

In a first aspect, a pitch varying device for a wind turbine blade is provided according to an embodiment of the present application, and is configured to control a pitch angle of a blade rotatably mounted on a hub, the blade is mounted on the hub through a pitch bearing, and the pitch varying device for the wind turbine blade includes:

a disc-type driving structure fixedly mounted on the blade and being perpendicular to an axis of the pitch bearing, wherein a track surrounding the axis of the pitch bearing is provided on the disc-type driving structure;

a first linear telescopic driving mechanism having one end hinged to the hub and another end connected to the track through a first clamping member capable of clamping the track, wherein the first linear telescopic driving mechanism and the first clamping member are connected through a hinge connection; and a second linear telescopic driving mechanism having one end hinged to the hub and another end connected to the track through a second clamping member capable of clamping the track, wherein the second linear telescopic driving mechanism and the second clamping member are connected through a hinge connection.

In a second aspect, a control method for the pitch varying device for the wind turbine blade is further provided according to an embodiment of the present application, including:

acquiring an included angle between a target pitch angle and a present pitch angle;

comparing the included angle with a preset threshold; and in a case that the included angle is greater than the preset threshold, sending a first control signal, wherein the first control signal is configured to control the second linear telescopic driving mechanism to drive the disc-type driving structure, to allow the blade to approach the target pitch angle; and in a case that the included angle is smaller than or equal to the preset threshold, sending a second control signal, wherein the second control signal is configured to control the first linear telescopic driving mechanism to drive the disc-type driving structure, to allow the blade to reach the target pitch angle; and wherein the preset threshold is greater than 0 degrees.

In a third aspect, a pitch varying control device for the pitch varying device for the wind turbine blade is further provided according to an embodiment of the present application, including:

an acquiring unit configured to acquire an included angle between a target pitch angle and a present pitch angle;

a determining unit configured to compare the included angle with a preset threshold; and a signal sending unit, wherein in a case that the included angle is greater than the preset threshold, the signal sending unit is configured to send a first control signal, and the first control signal is configured to control the second linear telescopic driving mechanism to drive the disc-type driving structure, to allow the blade to approach the target pitch angle; and in a case that the included angle is smaller than or equal to the preset threshold, the signal sending unit is configured to send a second control signal, and the second control signal is configured to control the first linear telescopic driving mechanism to drive the disc-type driving structure, to allow the blade to reach the target pitch angle; and wherein the preset threshold is greater than 0 degrees.

In a fourth aspect, a wind turbine is further provided according to an embodiment of the present application, including the above pitch varying device for the wind turbine blade and the pitch varying control device for the wind turbine.

A pitch varying device, a pitch varying method and a pitch varying control device for a wind turbine blade and a wind turbine are provided according to the present application. The pitch varying device replaces an existing integral-type pitch varying system driven by a gear, realizes segmental pitch varying of the wind turbine, thus overcoming friction loss between tooth faces of a driving gear and the pitch bearing during the pitch varying process (particularly the small-angle pitch varying process), prolonging the service life of the pitch bearing, and reducing the maintenance cost, thereby improving the pitch varying performance and the power generation quality of the wind turbine.

BRIEF DESCRIPTION OF THE DRAWINGS

The present application will be better understood from the following descriptions made in conjunction with the drawings.

Other features, objects, and advantages of the present application will become more apparent with reference to the detailed description of non-limitative embodiments made in conjunction with the drawings, in which, same or similar reference numerals refer to same or similar features.

Figure 1:
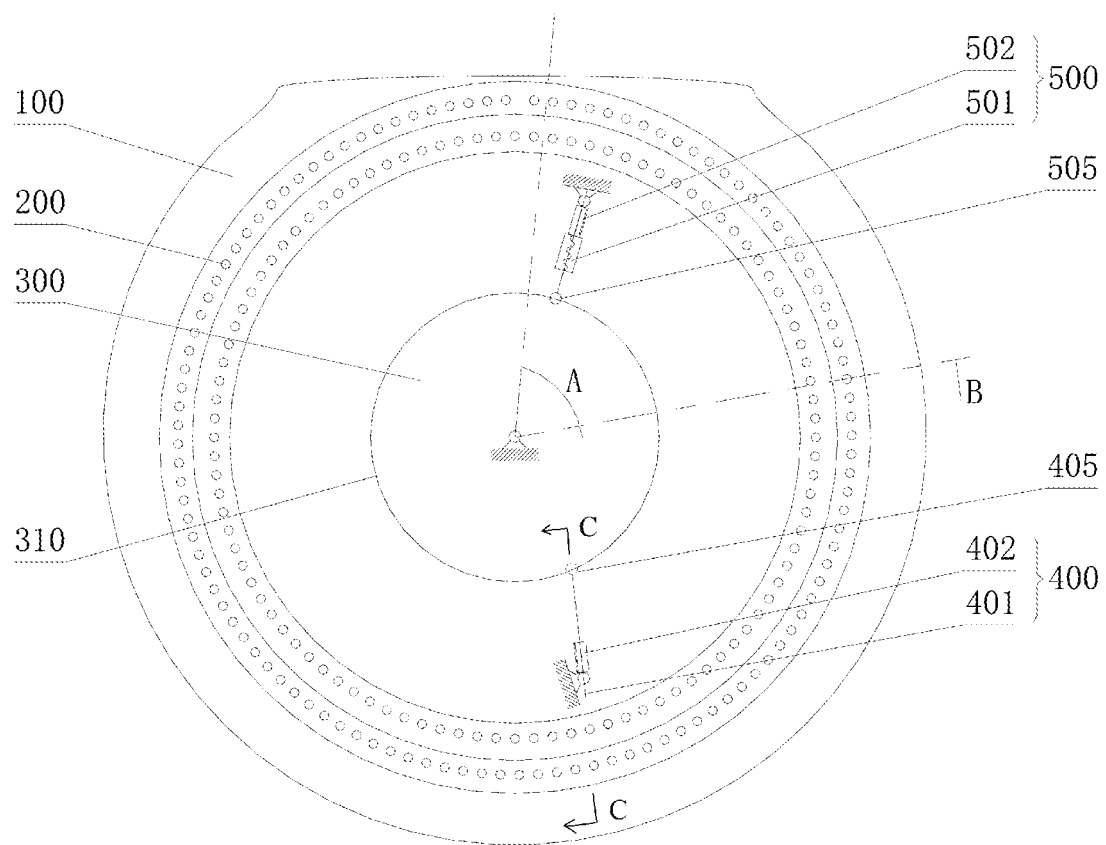
FIG. 1 is a schematic view showing the structure of a pitch varying device for a wind turbine blade according to an embodiment of the present application.

| Reference Numerals in the Figures: | | | |
|---|---|---|---|
| 100 | hub, | 200 | pitch bearing, |
| 300 | disc-type driving structure, | 310 | track, |
| 320 | main body portion, | | |
| 400 | first linear telescopic driving mechanism, | | |
| 401 | first telescopic member, | 402 | first driving mechanism, |
| 405 | first clamping member, | 4051 | first clamping body, |
| 4052 | clamp driving mechanism, | 40521 | piston, |
| 500 | second linear telescopic driving mechanism, | | |
| 501 | second telescopic member, | 502 | second driving mechanism, |
| 505 | second clamping member. | | |

DETAILED DESCRIPTION

Features in various aspects and exemplary embodiments of the present application are described in detail below. In the following detailed description, numerous specific details are set forth in order to help thorough understanding of the present application. However, it is obvious to those skilled in the art that the present application may be implemented without some of these specific details. The following descriptions of the embodiments are merely intended to provide better understanding of the present application by illustrating examples of the present application. The present application is not limited to any specific configuration and algorithm presented hereinafter; and any modification, replacement and improvement of elements, members and algorithms are covered in the scope of the present application without departing from the spirit of the present application. In the drawings and the following description, well-known structures and techniques are not illustrated to avoid unnecessarily obscuring the present application.

Exemplary embodiments will be described more fully with reference to the accompanying drawings. However, the exemplary embodiments can be implemented in various forms, and it should not be construed that the present application is limited to the embodiments illustrated herein; on the contrary, these embodiments are provided to make the present application more all-sided and complete, and to fully convey the concepts of the exemplary embodiments to those skilled in the art. In the drawings, thicknesses of regions and layers may be exaggerated for clarity. Same reference numerals in the drawings indicate same or similar structures, and thus their detailed descriptions are omitted.

In the description of the present application, it should be noted that the orientation or positional relationships indicated by terms such as "center", "up", "down", "left", "right", "vertical", "horizontal", "inner", "outer", and the like are based on the orientation or positional relationships shown in the drawings, and are merely for the convenience of describing the present application and the simplification of the description, and do not indicate or imply that the device or element referred to must have a particular orientation, or be configured and operated in a particular orientation, which therefore should not be construed as a limitation to the scope of the present application. In addition, terms such as "first", "second", "third" and the like are merely for description, and should not be construed as indicating or implying relative importance.

As shown in FIG. 1, a pitch varying device for a wind turbine blade is provided according to an embodiment of the present application, which is configured to control a pitch angle of a blade rotatably mounted on a hub 100. The blade is mounted on the hub 100 through a pitch bearing 200, and the pitch varying device for the wind turbine blade includes a disc-type driving structure 300, a first linear telescopic driving mechanism 400, and a second linear telescopic driving mechanism 500.

The disc-type driving structure 300 is fixedly mounted on the blade and is perpendicular to an axis of the pitch bearing 200, and a track 310 surrounding the axis of the pitch bearing 200 is provided on the disc-type driving structure 300.

The first linear telescopic driving mechanism 400 has one end hinged to the hub 100, and another end connected to the track 310 through a first clamping member 405 capable of clamping the track 310, and the first linear telescopic driving mechanism 400 and the first clamping member 405 are connected by a hinge connection.

The second linear telescopic driving mechanism 500 has one end hinged to the hub 100, and another end connected to the track 310 through a second clamping member 505 capable of clamping the track 310, and the second linear telescopic driving mechanism 500 and the second clamping member 505 are connected by a hinge connection.

Specifically, the end of the first linear telescopic driving mechanism 400 may pass through a hole provided in the disc-type driving structure 300 to be hinged to the hub 100, and the end of the second linear telescopic driving mechanism 500 may pass through another hole provided in the disc-type driving structure 300 to be hinged to the hub 100.

In the pitch varying device for the wind turbine blade according to this embodiment, the first linear telescopic driving mechanism 400 may use a high-accuracy actuating device to achieve accurate actuation, and the second linear telescopic driving mechanism 500 may use a high thrust and long stroke actuating device to perform long stroke actuation. The two telescopic driving mechanisms cooperate to replace the existing integral type pitch varying system driven by a gear, and thus, small-angle pitch varying control of the blade can be achieved by only using the first linear telescopic driving mechanism 400; and in a case that large-angle pitch varying control of the blade is required, first the second linear telescopic driving mechanism 500 is used for driving the blade, and then the first linear telescopic driving mechanism 400 is used for controlling the blade when a pitch varying angle is about to be reached, thereby realizing accurate control of the blade pitch varying angle.

In the pitch varying device for the wind turbine blade according to this embodiment, two telescopic driving mechanisms are employed to perform segmental actuation, thus overcoming friction loss between tooth faces of a driving gear and the pitch bearing during the pitch varying process (particularly the small-angle pitch varying process), prolonging the service life of the pitch bearing, and reducing the maintenance cost, thereby improving the pitch varying performance and the power generation quality of the wind turbine.

In the pitch varying device for the wind turbine blade according to this embodiment, when the first linear telescopic driving mechanism 400 drives the disc-type driving structure 300, the first clamping member 405 clamps the track 310, and the second clamping member 505 is disengaged from the track 310; and when the second linear telescopic driving mechanism 500 drives the disc-type driving structure 300, the first clamping member 405 is disengaged from the track 310, and the second clamping member 405 clamps the track 310.

The disc-type driving structure 300 is fixedly mounted on an inner ring or outer ring, that is fixedly connected to the blade, of the pitch bearing 200. For example, in a case that the outer ring of the pitch bearing 200 is fixedly connected to the blade, the disc-type driving structure 300 is fixedly mounted at the outer ring of the pitch bearing 200; or, in a case that the inner ring of the pitch bearing 200 is fixedly connected to the blade, the disc-type driving structure 300 is fixedly mounted at the inner ring of the pitch bearing 200.

Figure 3:
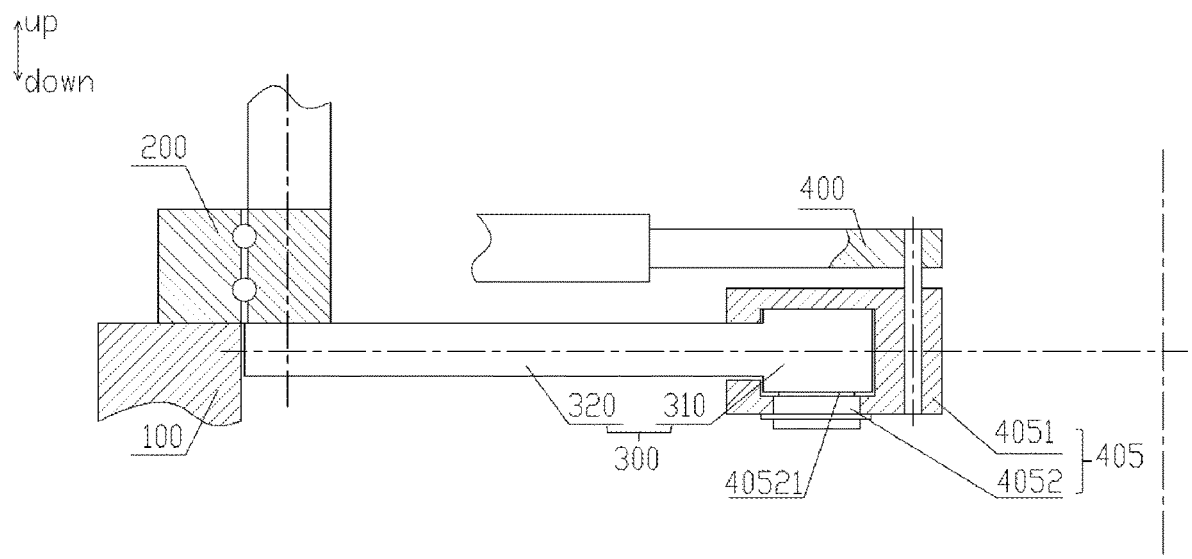
FIG. 3 is a partial sectional view taken along line C-C in FIG. 1.

In an embodiment, referring to FIG. 3, the disc-type driving structure 300 is a ring-shaped structure, in a radial direction of the ring-shaped structure, the disc-type driving structure 300 includes a main body portion 320 and an inner circumferential portion from outside to inside. At least a part of the inner circumferential portion has a thickness greater than that of the main body portion 320, and this part of the inner circumferential portion forms the track 310.

The first clamping member 405 includes a first clamping body 4051, and a clamp driving mechanism 4052 mounted at the first clamping body 4051. The first clamping body 4051 has an inner cavity configured to cooperate with the track 310, to realize clamping or releasing of the track 310. Specifically, in a case that the first clamping member 405 clamps the track 310, the track 310 cannot move with respect to the first clamping member 405, in this case, the track 310 is able to move together with the first clamping member 405; in a case that the first clamping member 405 is disengaged from the track 310, the track 310 is able to rotate in a circumferential direction with respect to the first clamping member 405.

The clamp driving mechanism 4052 includes a piston 40521 which is able to extend toward the track 310 or retract. When the track 310 is required to be clamped by the first clamping member 405, the piston 40521 is driven by the clamp driving mechanism 4052, one end of the piston 40521 extends to push the track 310 toward an upper surface of the inner cavity of the first clamping member 405, to make the end of the piston 40521 abut against a lower surface of the track 310, and an upper surface of the track 310 abut against the upper surface of the inner cavity of the first clamping body 4051 at the same time. In this case, friction is generated not only between the track 310 and the piston 40521 but also between the track 310 and the upper surface of the inner cavity, thus the track 310 is clamped tightly, and thereby the disc-type driving structure 300 can be driven to rotate by the first linear telescopic driving mechanism 400. When the track 310 is required to be disengaged from the first clamping member 405, the piston 40521 is driven to retract, in this case, the track 310 is not in contact with the end of the piston 40521, and the track 310 is not in contact with the upper surface of the inner cavity of the first clamping body 4051 either. In this case, the friction is disappeared, and the track 310 is disengaged from the first clamping member 405, thus the disc-type driving structure 300 cannot be driven by the first linear telescopic driving mechanism 400.

The structure and operating principle of the second clamping member 505 are similar to those of the first clamping member 405, which will not be described in detail herein.

In an embodiment, the upper surface of the track 310 protrudes upward with respect to the main body portion 320, and the lower surface of the track 310 protrudes downward with respect to the main body portion 320, that is, a cross section of the track 310 is T-shaped. The inner cavity of the first clamping body 4051 has a cross section matching with the track 310.

In an embodiment, the clamp driving mechanism 4052 is a hydraulic cylinder or a motor.

The track 310 may be a single track, and herein, the track 310 may be in the shape of a circle, an oval or an arc (i.e., part of a circle), and a center of the above circle, oval or arc is preferably the axis of the pitch bearing.

Optionally, the track 310 may be dual tracks, and the track 310 may be in the shape of a circle, an oval or an arc (i.e., part of a circle), and a center of the above circle, oval or arc is preferably the axis of the pitch bearing. In this case, the first linear telescopic driving mechanism 400 is connected to one track of the dual tracks, and the second linear telescopic driving mechanism 500 is connected to the other track of the dual tracks.

In the pitch varying device for the wind turbine blade according to this embodiment, the first linear telescopic driving mechanism 400 includes a first telescopic member 401 and a first driving mechanism 402. The first driving mechanism 402 drives the first telescopic member 401 to make a telescopic movement, the first driving mechanism 402 is hinged to the hub 100, and the first telescopic member 401 is hinged to the first clamping member 405.

The first driving mechanism 402 may be a linear motor or a hydraulic cylinder, the first telescopic member 401 is a telescopic rod, and the linear telescopic driving can be realized by using the linear motor or the hydraulic cylinder to drive the telescopic rod.

The first driving mechanism 402 may also be a bidirectional motor, accordingly, the first telescopic member 401 is a screw rod, and the screw rod is driven by the bidirectional motor to linearly drive a sleeve on the screw rod.

In the pitch varying device for the wind turbine blade according to this embodiment, the second linear telescopic driving mechanism 500 includes a second telescopic member 501 and a second driving mechanism 502. The second driving mechanism 502 drives the second telescopic member 501 to make a telescopic movement, the second driving mechanism 502 is hinged to the hub 100, and the second telescopic member 501 is hinged to the second clamping member 505.

The second driving mechanism 502 may be a linear motor or a hydraulic cylinder, the second telescopic member 501 is a telescopic rod, and the linear telescopic driving can be realized by using the linear motor or the hydraulic cylinder to drive the telescopic rod.

The second driving mechanism 502 may also be a bidirectional motor, accordingly, the second telescopic member 501 is a screw rod, and the screw rod is driven by the bidirectional motor to linearly drive a sleeve on the screw rod. The bidirectional motor is characterized by having a high actuation accuracy and a high control accuracy, and thus is adapted for small thrust situations, and is adapted for fine adjustment of pitch varying in situations that a wind speed is near a rated condition. The combination of the bidirectional motor and the screw rod can increase the thrust and stroke of the pitch varying driving mechanism, and thus is adapted for working conditions of a high wind speed or normal start and stop. By subdividing the pitch varying conditions, the pitch varying driving mechanism is subdivided, and features of the combination of the bidirectional motor and the screw rod are rationally utilized to reduce the cost of the pitch varying system, improve the accuracy and reliability of the pitch varying system, thereby improving the power generation quality of the wind turbine.

Optionally, the first linear telescopic driving mechanism 400 and the second linear telescopic driving mechanism 500 may employ the same structural design, or may employ different structural designs, that is, one of them employs the design of a high thrust and a long stroke, and the other one employs the design of a high accuracy and a short stroke, to meet control requirements for different accuracies and strokes. For example, in a case that a high thrust is required, the first linear telescopic driving mechanism 400 may employ multiple driving mechanisms connected in parallel as the first driving mechanism 402, to drive the first telescopic member 401, so as to provide a higher thrust, or, the first linear telescopic driving mechanism 400 may employ multiple driving mechanisms, each driving mechanism drives one respective telescopic member, fixed positions of all the driving mechanisms are spaced from a blade center by the same distances, and included angles between all the telescopic members and the track 310 are equal, thereby ensuring that the multiple driving mechanisms can drive the multiple telescopic members synchronously.

A control method for the pitch varying device for the wind turbine blade is further provided according to an embodiment of the present application, including:

acquiring an included angle A between a target pitch angle and a present pitch angle;

comparing the included angle A with a preset threshold B, wherein generally, the included angle A may be greater than the preset threshold B, and may also be smaller than the preset threshold B, and regarding these two situations:

in a case that the included angle A is greater than the preset threshold B, sending a first control signal which is configured to control the second linear telescopic driving mechanism 500 to drive the disc-type driving structure, to allow the blade to approach the target pitch angle; and in a case that the included angle A is smaller than or equal to the preset threshold B, sending a second control signal which is configured to control the first linear telescopic driving mechanism 400 to drive the disc-type driving structure, to allow the blade to reach the target pitch angle.

Positions of the first linear telescopic driving mechanism 400 and the second linear telescopic driving mechanism 500 in FIG. 1 are illustrative examples. It should be noted that, the positions of the first linear telescopic driving mechanism 400 and the second linear telescopic driving mechanism 500 are not limited to the positions shown in FIG. 1, and can be adjusted by those skilled in the art during implementation according to the design requirements.

According to the above control method, in the case that the included angle A is greater than the preset threshold B, first the second linear telescopic driving mechanism 500 is used to drive the blade to approach the target pitch angle; and in a case that the included angle A is smaller than (or equal to) the preset threshold B, the second linear telescopic driving mechanism 500 is controlled to stop, and at the same time, the first linear telescopic driving mechanism 400 is started to continue to drive the blade to reach the target pitch angle.

The included angle A ranges from 0 to 90 degrees, and the preset threshold B ranges from 0.1 to 5 degrees. The preset threshold B can be adjusted according to the requirements of design and usage, for example, the preset threshold B can be generally set to be 2 or 3 degrees.

In the case that the included angle A is smaller than or equal to the preset threshold B, a first reset signal is sent and is configured to allow the first clamping member 405 to clamp the track 310, the second clamping member 505 to be disengaged from the track 310, and the second linear telescopic driving mechanism 500 to be reset to an initial position.

In the case that the included angle A is greater than the preset threshold B, a second reset signal is sent and is configured to allow the first clamping member 405 to be disengaged from the track 310, the second clamping member 505 to clamp the track 310, and the first linear telescopic driving mechanism 400 to be reset to an initial position.

Controlling the two clamping members can avoid a self-locking phenomenon of the two telescopic driving mechanisms during the driving process. When one of the telescopic drive mechanisms is started, the other one of the telescopic drive mechanisms is automatically reset, which facilitates the control of the next pitch varying driving.

Both the second linear telescopic driving mechanism 500 and the first linear telescopic driving mechanism 400 at the initial positions are not perpendicular to the track 310, which can avoid the situation that a driving direction cannot be controlled during the driving process of the linear telescopic driving mechanisms, thus avoiding damages to the track 310 on the disc-type driving structure 300.

When the blade rotates to the target pitch angle, a stop signal is sent and is configured to control the two linear telescopic driving mechanisms to stop at the same time, and to control the two clamping members to clamp the track, so as to lock the pitch varying angle through the two linear telescopic driving mechanisms, thus the pitch varying angle of the blade is more stable and is not apt to be affected by the wind.

A pitch varying control device is further provided according to an embodiment of the present application, including:

an acquiring unit configured to acquire an included angle A between a target pitch angle and a present pitch angle;

a comparing unit configured to compare the included angle A with a preset threshold B;

a signal sending unit; wherein in a case that the included angle A is greater than the preset threshold B, the signal sending unit is configured to send a first control signal, and the signal sending unit is configured to control the second linear telescopic driving mechanism 500 to drive the disc-type driving structure 300, to allow the blade to approach the target pitch angle; and in a case that the included angle A is smaller than or equal to the preset threshold B, the signal sending unit is configured to send a second control signal, and the second control signal is configured to control the first linear telescopic driving mechanism 400 to drive the disc-type driving structure 300, to allow the blade to reach the target pitch angle.

The included angle A ranges from 0 to 90 degrees, and the preset threshold B ranges from 0.1 to 5 degrees. The preset threshold B can be adjusted according to the requirements of design and usage, for example, the preset threshold B can be generally set to be 2 or 3 degrees.

Optionally, in the case that the included angle A is smaller than or equal to the preset threshold B, the signal sending unit is further configured to send a first reset signal, and the first reset signal is configured to control the second linear telescopic driving mechanism 500 to be reset to an initial position; and in the case that the included angle A is greater than the preset threshold B, the signal sending unit is configured to send a second reset signal, and the second reset signal is configured to control the first linear telescopic driving mechanism 400 to be reset to an initial position.

Optionally, both the second linear telescopic driving mechanism 500 and the first linear telescopic driving mechanism 400 at the initial positions are not perpendicular to the track 310.

Optionally, when the blade rotates to the target pitch angle, the signal sending unit is further configured to send a stop signal, and the stop signal is configured to control the two linear telescopic driving mechanisms to stop at the same time, and to control the two clamping members to clamp the track.

Optionally, the pitch varying control device is embedded in a main controller and/or a pitch varying controller.

In performing a pitch varying control on the blade, the pitch varying control device is used to control two clamping members to clamp the track alternately, to avoid a phenomenon that the blade is locked up when the two clamping members clamp the track at the same time.

The pitch varying control device according to this embodiment may be an electronic control device, for example, the clamping action of each clamping member is realized through driving of a small motor, and the action of the small motor is controlled by the pitch varying control device to ensure a smooth pitch varying process.

Figure 2:
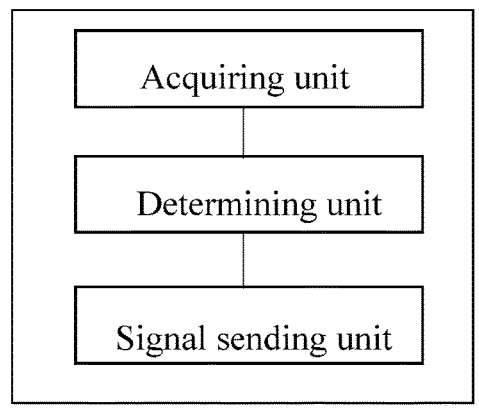
FIG. 2 is a schematic view showing the structure of a pitch varying control device of the pitch varying device for the wind turbine blade according to an embodiment of the present application.

The pitch varying control device in FIG. 2 is only an illustrative example. It should be understood that, the pitch varying control device in this embodiment may also employ a mechanical transmission device, in particular, it can be realized through linkage with the two linear telescopic driving mechanisms. For example, the first clamping member 405 is linked with the first linear telescopic driving mechanism 400, and when the first linear telescopic driving mechanism 400 is started, it automatically controls the first clamping member 405 to clamp the track 310; and when the first linear telescopic driving mechanism 400 is stopped, it automatically controls the first clamping member 405 to release the track. The second clamping member 505 can be designed with reference to the design of the first clamping member 405, which will not be further described herein.

A wind turbine is further provided according to an embodiment of the present application, including the pitch varying device and the pitch varying control device for the wind turbine blade according to the above embodiments.

The wind turbine according to the embodiment of the present application replaces an existing integral-type pitch varying system driven by a gear, and realizes segmental pitch varying of the wind turbine, thus overcoming friction loss between tooth faces of a driving gear and the pitch bearing during the pitch varying process (particularly the small-angle pitch varying process), prolonging the service life of the pitch bearing, and reducing the maintenance cost, thereby improving the pitch varying performance and the power generation quality of the wind turbine.

It should be understood by those skilled in the art that, the above embodiments are all exemplary rather than limitative. Different technical features in different embodiments can be combined to achieve beneficial results. Through studying the drawings, the specification and the claims, those skilled in the art can understand and implement other varied embodiments of the disclosed embodiments. In the claims, the term "comprising" does not exclude other devices or steps; the indefinite article "a" or "an" does not exclude a plurality; the terms "first" and "second" are used to indicate a name rather than indicating any specific order. Any reference numerals in the claims should not be construed as limitation to the scope of protection. The functions of the various parts in the claims can be realized by a single hardware or software module. The presence of certain technical features in different dependent claims does not mean that these technical features cannot be combined to achieve beneficial results.

What is claimed is:

1. A pitch varying device for a blade of a wind turbine, configured to control a pitch angle of the blade rotatably mounted on a hub, and the blade being mounted on the hub through a pitch bearing, and the pitch varying device comprises:

a driving structure fixedly mounted on the blade and being perpendicular to an axis of the pitch bearing, wherein a track surrounding the axis of the pitch bearing is provided on the driving structure;

a first linear telescopic driving mechanism having one end hinged to the hub and another end hinged to a first clamping member; and a second linear telescopic driving mechanism having one end hinged to the hub and another end hinged to a second clamping member; wherein the first linear telescopic driving mechanism is configured to drive the driving structure in a case that an included angle between a target pitch angle and a present pitch angle is smaller than or equal to a preset threshold; in this case, the first clamping member is configured to clamp the track, and the second clamping member is configured to be disengaged from the track; and the second linear telescopic driving mechanism is configured to drive the driving structure in a case that the included angle is greater than the preset threshold; in this case, the second clamping member is configured to clamp the track, and the first clamping member is configured to be disengaged from the track.

2. The pitch varying device according to claim 1, wherein the driving structure is fixedly mounted on an inner ring or an outer ring, that is fixedly connected to the blade, of the pitch bearing.

3. The pitch varying device according to claim 2, wherein the outer ring of the pitch bearing is fixedly connected to the blade, or the inner ring of the pitch bearing is fixedly connected to the blade.

4. The pitch varying device according to claim 1, wherein
the driving structure is a ring-shaped structure, and in a radial direction of the ring-shaped structure, the driving structure comprises a main body portion and an inner circumferential portion from outside to inside; and
at least a part of the inner circumferential portion has a thickness greater than that of the main body portion, and the least a part of the inner circumferential portion forms the track.

5. The pitch varying device according to claim 1, wherein
the first clamping member comprises a first clamping body and a clamp driving mechanism mounted at the first clamping body; and
the clamp driving mechanism comprises a piston configured to extend toward the track or retract.

6. The pitch varying device according to claim 1, wherein the first linear telescopic driving mechanism comprises a first telescopic member and a first driving mechanism, the first driving mechanism is configured to drive the first telescopic member to make a telescopic movement, the first driving mechanism is hinged to the hub, and the first telescopic member is hinged to the first clamping member.

7. The pitch varying device according to claim 6, wherein the first driving mechanism is a motor or a hydraulic cylinder.

8. The pitch varying device according to claim 1, wherein the second linear telescopic driving mechanism comprises a second telescopic member and a second driving mechanism, the second driving mechanism is configured to drive the second telescopic member to make a telescopic movement, the second driving mechanism is hinged to the hub, and the second telescopic member is hinged to the second clamping member.

9. The pitch varying device according to claim 8, wherein the second driving mechanism is a motor or a hydraulic cylinder.

10. A control method for the pitch varying device according to claim 1, comprising:
acquiring the included angle between the target pitch angle and the present pitch angle;
comparing the included angle with the preset threshold; and
in the case that the included angle is greater than the preset threshold, sending a first control signal and a second reset signal, wherein the first control signal is configured to control the second linear telescopic driving mechanism to drive the driving structure, to allow the blade to approach the target pitch angle, and the second reset signal is configured to control the first linear telescopic driving mechanism to be reset to an initial position; and
in the case that the included angle is smaller than or equal to the preset threshold, sending a second control signal and a first reset signal, wherein the second control signal is configured to control the first linear telescopic driving mechanism to drive the driving structure, to allow the blade to reach the target pitch angle, and the first reset signal is configured to control the second linear telescopic driving mechanism to be reset to an initial position; and
wherein the preset threshold is greater than 0 degrees.

11. The control method according to claim 10, wherein both the second linear telescopic driving mechanism and the first linear telescopic driving mechanism at the initial positions are not perpendicular to the track.

12. The control method according to claim 10, comprising:
sending a stop signal when the blade rotates to the target pitch angle, wherein the stop signal is configured to control the two linear telescopic driving mechanisms to stop at the same time, and to control the two clamping members to clamp the track.

13. The control method according to claim 10, wherein the preset threshold ranges from 0.1 to 5 degrees.

14. A pitch varying control device for the pitch varying device according to claim 1, comprising:
an acquiring unit configured to acquire the included angle between the target pitch angle and the present pitch angle;
a determining unit configured to compare the included angle with the preset threshold; and
a signal sending unit; and wherein
in the case that the included angle is greater than the preset threshold, the signal sending unit is configured to send a first control signal, and the first control signal is configured to control the second linear telescopic driving mechanism to drive the driving structure, to allow the blade to approach the target pitch angle; and
in the case that the included angle is smaller than or equal to the preset threshold, the signal sending unit is configured to send a second control signal, and the second control signal is configured to control the first linear telescopic driving mechanism to drive the driving structure, to allow the blade to reach the target pitch angle; and
wherein the preset threshold is greater than 0 degrees.

15. The pitch varying control device according to claim 14, wherein
in the case that the included angle is smaller than or equal to the preset threshold, the signal sending unit is further configured to send a first reset signal, and the first reset signal is configured to control the second linear telescopic driving mechanism to be reset to an initial position; and
in the case that the included angle is greater than the preset threshold, the signal sending unit is further configured to send a second reset signal, and the second reset signal is configured to control the first linear telescopic driving mechanism to be reset to an initial position.

16. The pitch varying control device according to claim 15, wherein both the second linear telescopic driving mechanism and the first linear telescopic driving mechanism at the initial positions are not perpendicular to the track.

17. The pitch varying control device according to claim 14, wherein the signal sending unit is further configured to send a stop signal when the blade rotates to the target pitch angle, and the stop signal is configured to control the two linear telescopic driving mechanisms to stop at the same time, and to control the two clamping members to clamp the track.

18. The pitch varying control device according to claim 14, wherein the pitch varying control device is embedded in a main controller and/or a pitch varying controller.

19. A wind turbine, comprising the pitch varying control device according to claim 14.

* * * * *